May 1, 1928.

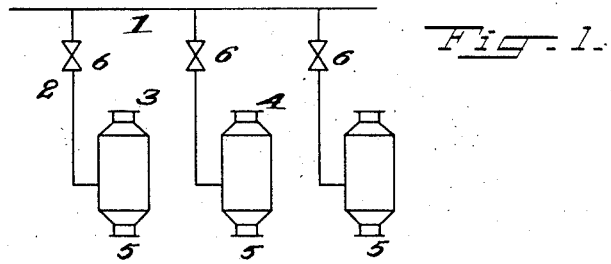
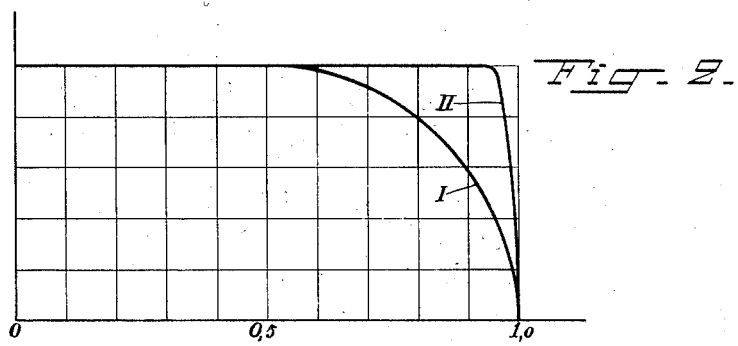
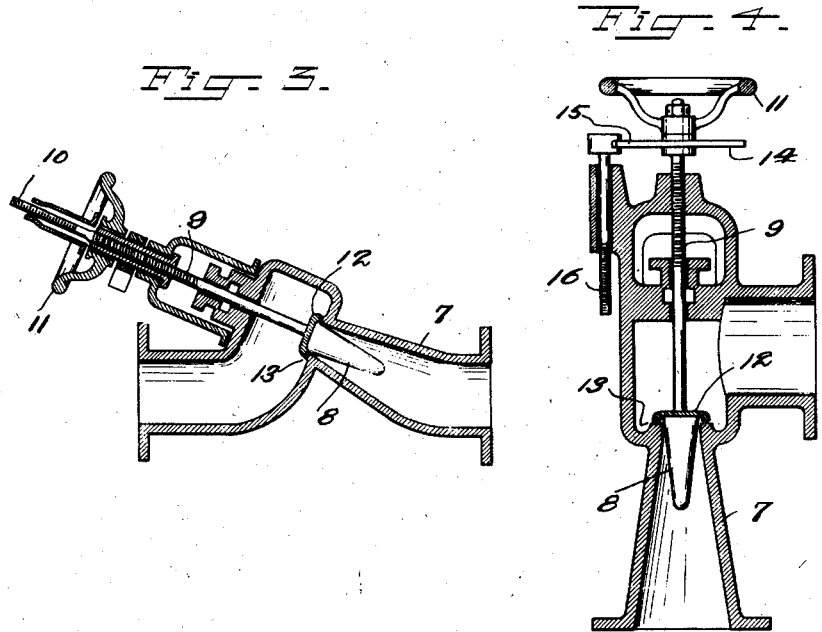

J. RUTHS

NOZZLE STOP VALVE

Filed July 3, 1922      3 Sheets-Sheet 2

1,668,128

Inventor
J. Ruths,
By Marks Clerk
Attys.

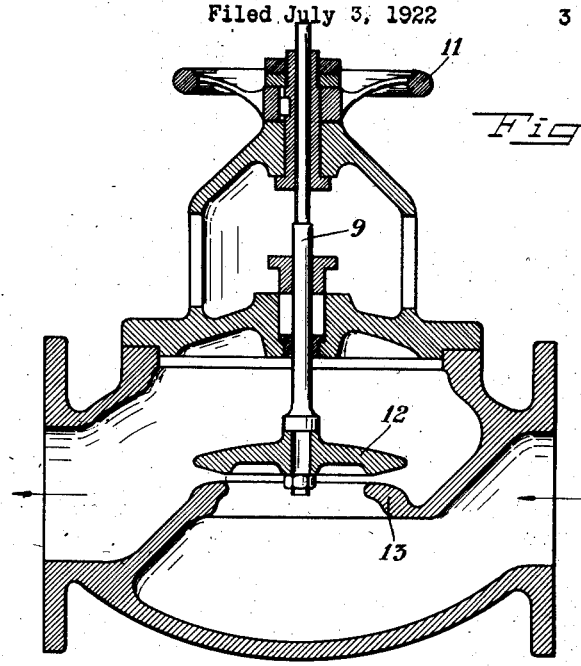
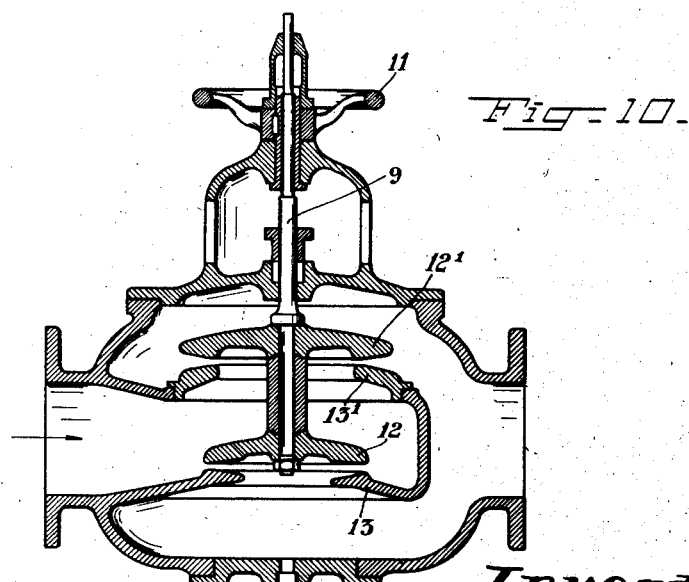

Patented May 1, 1928.

1,668,128

UNITED STATES PATENT OFFICE.

JOHANNES RUTHS, OF DJURSHOLM, SWEDEN, ASSIGNOR TO AKTIEBOLAGET VAPOR-ACKUMULATOR, OF STOCKHOLM, SWEDEN, A CORPORATION.

NOZZLE STOP VALVE.

Application filed July 3, 1922, Serial No. 572,654, and in Sweden June 18, 1921.

The stop valves, for instance the usual disc valves, generally used for controlling the flow of gas or steam through a pipe line or conduit are very unsuitable for this purpose, in that the rate of flow through such a valve is dependent on the gas pressure before as well as behind the valve. The rate of flow is approximatively proportional to the square root of the difference between the pressures on both sides of the valve. As this difference in pressure, or pressure drop, is rather small, as a rule, it is evident that if the pressure is somewhat altered on either side or on both sides of the valve, this will have a very great influence on the quantity of steam flowing through the valve. Assuming for instance that in a conduit there prevails a pressure of 10 atm. before the valve and one of 9 atm. behind the same, then, if for some reason or other the pressure behind the valve should rise to 9.5 atm. the rate of flow through the valve would be so many times less as 1 is less than the square root of 2, i. e. it would be about 30 per cent smaller. Again, if the pressure behind the valve should rise up to 9.8 atm., the rate of flow would be reduced by about 55 per cent. If the rate of flow through the conduit is to be kept constant or nearly constant, it is evident that, even if the said pressures vary, the opening of the valve must be constantly regulated according to the variations in the pressures. Further, in a plant fitted with such valves, there are some more drawbacks, mentioned below, which drawbacks will be described with reference to Fig. 1 of the accompanying drawing.

In the drawings, Fig. 1 is a diagrammatic view of a system using the improved nozzle stop valve;

Fig. 2 is a graphic comparison of the results obtained by the usual valve and by the improved valve;

Fig. 3 is a section through one form of the nozzle stop valve;

Figs. 4 to 10 are sections through modifications of the nozzle stop valve.

Figure 6:
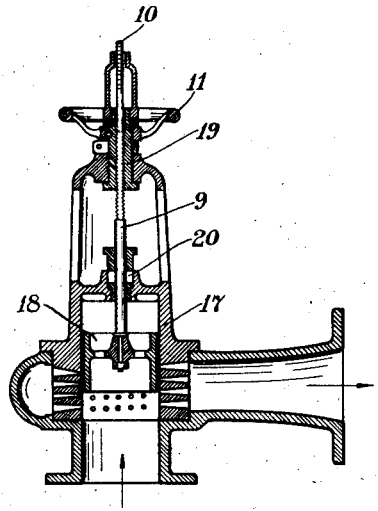

Fig. 1 shows a main steam or gas pipe line 1 to which are connected several branch pipes 2, 3 and 4. These pipes conduct the steam to consumers consisting for instance in digesters, boiling vats 5, dryers and the like. In the said branch pipes are inserted valves 6, assumed to be ordinary disc stop valves. It is further assumed that a pressure of 10 atm. prevails in the main pipe 1 and that a pressure of 9 atm. is to be maintained behind the valve 6 in the pipes 2, 3 and 4. Now, if for any reason the pressure in pipe 2 behind the valve 6 should rise for example to 9.5 atm., the rate of flow through 6 to this pipe 2 would be about 30 per cent. less, that is to say only about ⅔ of what it was before. On account of this, the pressure in pipe 1 will rise somewhat, and, for this reason, the rate of flow through the other valves 6 in the pipes 3 and 4 will be increased as the difference in pressure before and behind these valves is now greater than before, which circumstance, in turn, necessitates a readjustment also of valves inserted in other pipes, in that the rise of pressure in 1 reacts on the rate of flow through them. The present invention consists in an adjustable valve so disposed that the rate of flow therethrough is independent of the difference in the pressures on the inlet and outlet side thereof. That is to say, the rate of the flow through the valve is proportional to the height of pressure at its inlet and to the area of the cross section of the passage of the valve.

Even fairly great variations in the pressure before the valve at its inlet have only a very small influence on the rate of flow therethrough, as will be shown in the following example:

It is assumed, as above, that the pressure before the valve is 10 atm. and the pressure behind it 9.5 atm. Now, if for any reason the pressure before the valve should rise to 10.5 atm. the difference in the pressure on both sides of the valve will be doubled, which, if a common valve is used, would mean that the rate of flow therethrough would be so many times greater as the square root of 2 is greater than 1, i. e. would be increased by 41 per cent. If, on the other hand, a valve according to the present invention is used, by which the rate of flow, as mentioned above, is only dependent on the pressure before the valve and is proportional to the amount of this pressure, the rate of flow will only be increased by about 5 per cent.

With the aid of a valve according to this invention it will be possible to adapt the supply of steam to each consumer to exactly suit the demand. This is of considerable value in all manufacturing processes where steam is used for drying and boiling purposes, as a more even and superior quality of the product may be attained thereby.

In such manufacturing processes where the pressure in the steam consuming apparatus rises as steam is supplied during the process, it will be possible, by using such a valve, to adjust the rate of the steam supply independently of the said pressure in the apparatus and to keep such rate constant without the necessity of regulating of the valve according to alterations in the pressure in the apparatus.

It is evident from the above that, when common stop valves are used as regulating valves, it nearly always happens that if the steam supply to any steam consumer is increased or reduced, the operation of all the other steam consumers connected to the same steam supply pipe, will be considerably disturbed. This drawback is eliminated by the invention.

Preferably the invention consists in a valve shaped as a de Laval nozzle, through which the steam has to pass. The invention is illustrated in Figs. 2–10. Fig. 2 is a diagram showing the amount of steam passing through a valve of the common type, as well as through a valve according to the invention, under different conditions of pressure before and behind the valve.

Figs. 3–5 show non-balanced valves, whereas Figs. 6–10 represent embodiments of balanced valves, constructed in accordance with the invention.

With the aid of Fig. 2, the principle of the present invention will be more fully explained.

One of the fundamental equations for flow of gas through an orifice is:

$$D = F_2 \cdot \frac{C_2}{V_2}$$

where $D$ is the rate of flow through the nozzle.

$F_2$ is the cross-sectional area of the orifice, $C_2$ is the velocity of the gas flowing through the orifice, and $V_2$ is the specific volume of the gas when leaving the orifice.

The velocity $C_2$ is dependent on the difference between pressure $p_1$ before the orifice and the pressure $p_2$ behind the orifice.

The specific volumne $V_2$ is also dependent on $p_1$ and $p_2$ wherefore $\frac{C_2}{V_2}$ may be written as a function of $p_1, p_2$ so that $$\frac{C_2}{V_2} = f(p_1, p_2)$$

Taking a given value of $p_1$, and allowing $p_2$ to drop from this value to different lower values and noting the value of the function $f(p_1, p_2)$ it can be determined that the value of the function increases with decrease of $p_2$, very quickly at first, but more slowly as $p_2$ drops lower until a maximum value of the function, that is of rate of flow will be reached at a relation.

$$\frac{p_2}{p_1} = 0.57 \text{ for saturated steam and}$$

$$\frac{p_2}{p_1} = 0.53 \text{ for superheated steam.}$$

If the pressure behind the orifice falls below values with relation to $p_1$ as determined by the above ratios, for example if $p_2$ is less than $0.53\, p_1$ the rate of flow through the orifice will be constant. A further drop of $p_2$ will not increase the flow. The ratio giving maximum rate of flow is called "critical ratio" and the corresponding velocity is known as "critical velocity."

Above the critical ratio the amount of steam flowing through the orifice is dependent on both factors of pressure, both behind and before the orifice.

In Fig. 2 curve I shows the relation determined by the flow function and the maximum ratio with respect to superheated steam. The abscissa represent values of $\frac{p_2}{p_1}$ and ordinates the steam flow. Taking $p_1$ as unity, it is to be seen that for values above 0.53 the rate of flow is dependent on the value of $p_2$.

Practically all valves which serve to pass steam from one conduit to another, following the laws of the orifice as above set out, allow passage of steam dependent on changes of back pressure since they usually operate on pressure differences with ratios above 0.53. Obviously it would be a poor arrangement where a drop of pressure of 50% or more occurs in a valve as the power in the drop of pressure is then unused.

Now, on the other hand, the values of $p_2$ less than $0.53\, p_1$ are used very effectively in turbines because the intent there is to produce velocity of steam. This is done by means of a gradually expanding nozzle. Such a nozzle has a minimum cross-section at the beginning, and gradually expands. The expansion must be such that decomposition of the jet is avoided.

The above stated equation:

$$D_2 = F_2 \frac{C_2}{V_2} \text{ also}$$

applies in this case with reference to the outlet cross section. Taking into account the smallest cross section $F_m$, the following is found to be the equation for nozzles:

$$\frac{D}{F_m} = \frac{F_2}{F_m} \cdot \frac{C_2}{V_2} = \frac{F_2}{F_m} f(p_1, p_2)$$

The ratio of divergence of the nozzle then comes in as a factor. Now turbine work has shown that the ratio of divergence is greater, the greater the difference between $p^2$ and $p_1$ and that this ratio decreases as $p_2$ approaches 0.53. For back pressures greater than 0.53 of the initial maximum exit velocity is obtained from nozzles of uniform cross-section or with sides convergent. The divergence of nozzles has, for the higher ratios, been thought to be of no use. If velocity is to be obtained, divergence is then a hindrance.

The present invention relates to the field of pressure ratios higher than 0.53 in which expanding nozzles have not previously been used and in which throttling valves have been used of such construction that flow is dependent upon initial as well as final pressure.

A study of this field has shown that the effect represented by curve II of Fig. 2 can be obtained by use of a valve with a diverging nozzle for the field between pressure ratios 0.53 and almost 1.00 in contrast to the straight or convergent nozzles used for expansion.

This is evident since the last above equation shows that the effect produced can be obtained by multiplying values of curve I of Fig. 2 by the ratio of divergence $\frac{F_2}{F_m}$. The curve II thus obtained rises more rapidly toward the maximum value represented by the upper horizontal line which is determined by the critical ratio. The greater the ratio of divergence, the greater are the values.

The present invention therefore provides the new result within the field of pressure ratios between 0.53 and, for example, 0.97 that the flow of steam through a valve may be made independent of back pressure. The structure involved approaches in some phases the diverging de Laval nozzle used in the field between 0 and 0.53 wherefore the valve herein is given that name in description.

Fig. 3 is a diagrammatic representation of a valve structure for carrying out the present invention.

7 is the valve body of the de Laval nozzle type. 8 is a tapered pin fixed to the valve spindle 9 which affects the adjustment of the throat of the de Laval nozzle, without affecting its nozzle action and which, consequently, also renders possible an adjustment of the desired rate of flow.

As the rate of flow through the valve, as has been pointed out above, is proportional to the pressure before the valve and to the cross section thereof, and as the variations in pressure before the valve have only a small influence on the rate of flow, the latter will thus be practically dependent only on the cross-sectional area of passage, i. e. on the different positions of the tapered pin 8 in relation to the throat of the valve body 7.

To make it possible to read off the area of passage and the rate of the steam flow respectively, the valve spindle 9 is provided with a graduated scale 10 made so as to facilitate a direct or indirect reading thereon of the rate of flow through the valve.

The valve is actuated as usual with a hand wheel 11. To attain an absolutely tight fit against the leakage of steam on the valve being entirely closed, the pin 8 is fitted with a shoulder 12 shaped like a valve disc closing up against the seat 13. As will be seen from the figure, the valve above described is of a straight type.

Evidently, the valve may be modified and adapted in different ways.

Figure 4 shows a valve of angular type, i. e. for being inserted between two pipe lines disposed at right angles to each other. In a valve of this latter type, the graduated scale is shaped like a disc 14 fixed to the spindle 9. This disc revolves in a slot 15 provided in a slide 16 and brings this slide along with it when the hand wheel 11 is turned.

By graduating the slide 16 as well as the disc 14 it will be possible to effect a very accurate adjustment of the position of the spindle or the tapered pin respectively, that is to say of the effective area of the throat.

Thus it will be possible to very accurately adjust or read off the rate of the flow of steam through the valve.

Fig. 5 shows an embodiment in which the valve seats are shaped so that a nozzle action will be produced.

However, the valves according to the above-mentioned embodiments are not balanced, and, consequently, difficulties may be encountered in operating same, particularly at high steam pressures and with large valve dimensions. For example, if the valve is to be used as a regulating member actuated for instance by a speed governor or the like, this is often not feasible by reason of the valve being non-balanced.

Therefore, some embodiments of the invention will be described hereinbelow, in which embodiments the said drawbacks have been avoided by the valve being made as a balanced one.

In Fig. 6, an insertion piece 17 is arranged in the valve casing, the said insertion piece 17 being provided with circular passage openings shaped as de Laval nozzles. Arranged in this insertion piece before the passage openings is a movable plunger, slide or the like 18. This plunger is connected with the spindle 9 which is provided with a thread, by reason of which it is displaceable in the longitudinal direction thereof by turning the hand wheel 11 and the nut 19. Moreover, the spindle is provided, in accordance with the above description with reference to Fig. 3, with a graduated scale 10. The insertion piece 17 is constructed so as to have the nut 19 mounted therein. This insertion piece is further provided with packing boxes 20 for the spindle 9.

The operation of the valve is as follows:

The steam or the gas flows in the direction indicated by the arrows, the rate of flow being then independent of the difference in pressure before and behind the valve, in accordance with the description above. The amount of fluid passing in the unit of time only depends on the pressure before the valve and on the area of the passage, and inasmuch, as a rule, the pressure before the valve is constant or nearly so, the said amount of steam or gas may be adjusted to different values by altering the area of the passage. In the present case, this alteration takes place by displacing the plunger up or down. On the plunger being displaced upwards, a greater number of the passage openings provided in the insertion piece 17 are uncovered, said openings being optionally, if desired, spirally arranged. On the plunger being displaced downwards, the total area of passage is reduced.

It is obvious that a valve arranged in this manner is balanced so that there will be no more difficulties in operating the same, and it will be easy to adapt the valve as a regulating valve by causing a governor to directly or indirectly actuate the spindle 9 in some way or other.

A still more accurate control is obtained if, on the plunger being displaced up or down, the same is simultaneously turned, while it is also provided with a flange uncovering only one nozzle at a time.

Figure 7:
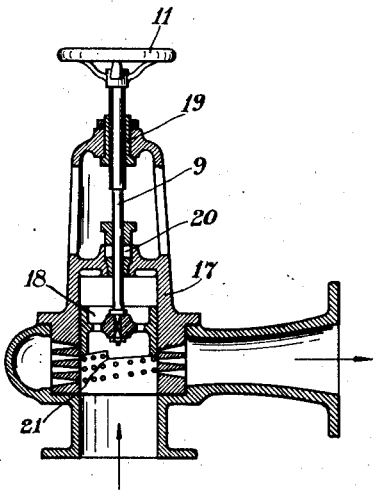

Such an embodiment is shown in Fig. 7. Herein the nozzles provided in the insertion piece are arranged along a helix, and the plunger 18 is provided with a flange 21. The helix, along which the nozzles are arranged, is made with the same pitch as the thread of the spindle 9. Thus, if the hand wheel 11 is turned, the plunger 18 will be turned at the same time therewith by reason of the thread of the spindle being displaced, and the flange 21 opens or closes for one nozzle at a time. A governor may be caused to actuate the spindle 9, an exceedingly accurate control being attained thereby.

Figure 8:
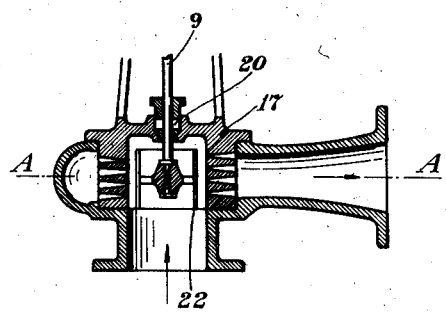
Figure 9:
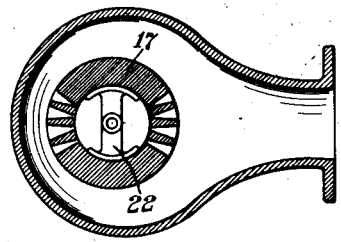

Another embodiment of the invention is shown in Figs. 8 and 9, in which the stop member is not made as a plunger adapted to be displaced up and down, but as a rotatable slide 22. By turning this slide, a greater or lesser number of the passage openings provided in the insertion piece 17, and shaped as de Laval nozzles, are being covered or uncovered.

Fig. 9 shows a section through the valve on line A—A. From this figure it will be seen how the passage openings are arranged in this case with respect to the rotatable slide 22.

Finally, Fig. 10 shows an embodiment of the invention with two valve discs 12, 12', the valve seats being so shaped that a nozzle action will be produced. In order to attain a complete balance in this case, the valve discs are made of different sizes. The operation of the valve will be clear from the above.

Other embodiments may also be conceived, the valve being for instance made with two nozzles disposed opposite each other, in which nozzles pins are adapted to be displaced so as to alter the area of the passage.

What I claim as new and desire to secure by Letters Patent of the United States of America is:—

1. A valve for use in steam systems where steam is to be supplied from one conduit to a second conduit having a pressure higher than 53 percent of the pressure in the first conduit, comprising ports, control members for said ports, a spindle connected to said control members, the contour of said ports and control members being such as to form a gradually expanding passageway in direction toward the spindle and a second gradually expanding passageway in direction away from the spindle.

2. A valve for use in steam systems where steam is to be supplied from one conduit to a second conduit having a pressure higher than 53 percent of the pressure in the first conduit, comprising a plurality of seats and a plurality of discs for said seats, the discs and seats being so designed as to form a plurality of gradually expanding nozzles in the form of annuli.

3. A balanced valve having a plurality of adjustable passages, said passages being in the form of nozzles of the de Laval nozzle type for all positions of adjustment of the valve, in order that the flow through the valve may be independent of pressure behind the valve for any given adjustment.

4. A balanced valve comprising a plurality of ports, a control member for each of said ports, a spindle connected to said control members, the contour of said ports and control members being such as to provide a plurality of passages of the de Laval nozzle type for all positions of the spindle, in order that the flow through the valve may be independent of the pressure behind the valve for any given position of the spindle.

In testimony whereof I affix my signature.

JOHANNES RUTHS